Patented Oct. 10, 1944

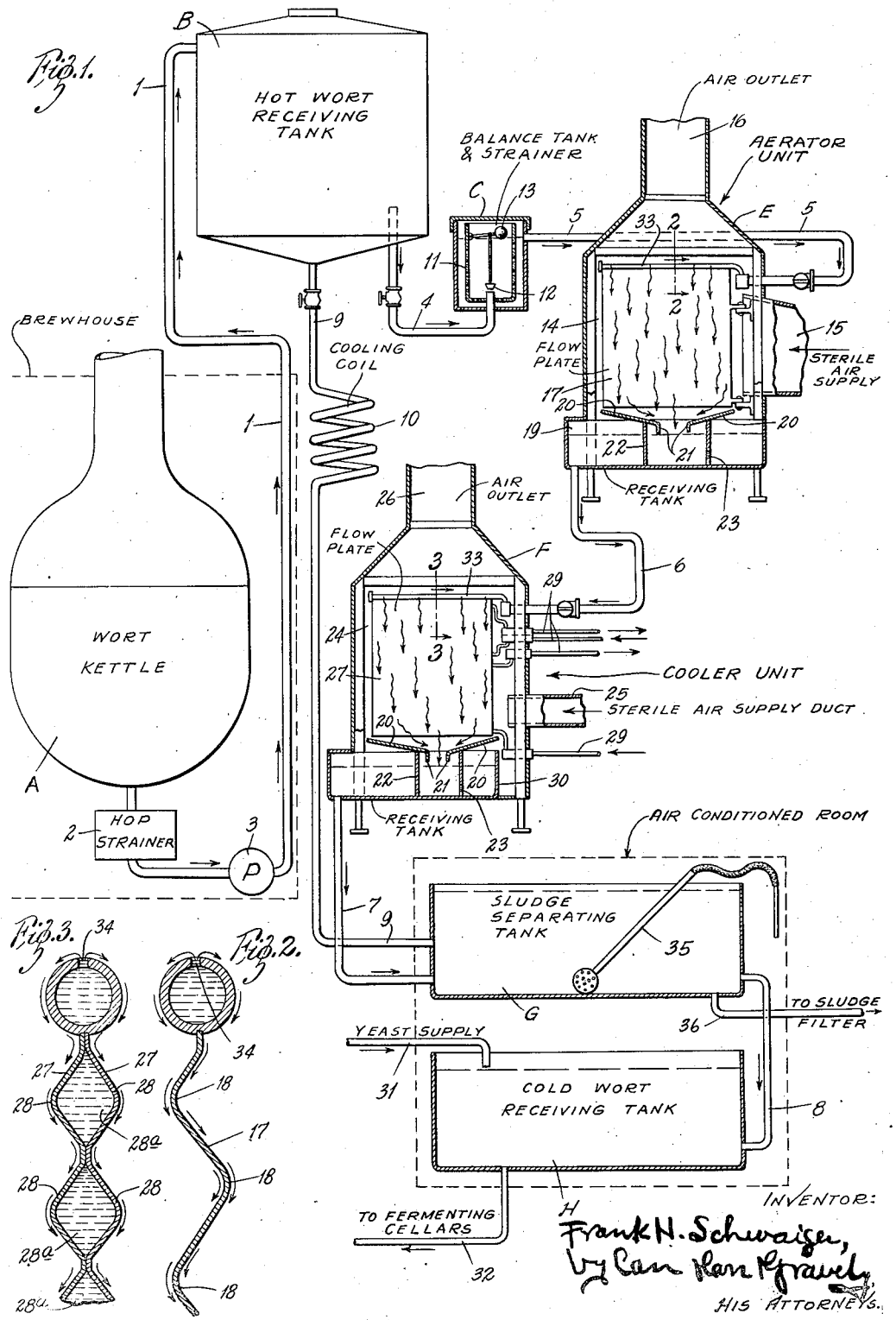

2,359,876

UNITED STATES PATENT OFFICE 2,359,876

BREWING

Frank H. Schwaiger, Grantwood Village, Mo., assignor to Anheuser-Busch, Incorporated, St. Louis, Mo., a corporation of Missouri Application June 29, 1942, Serial No. 448,917

6 Claims. (Cl. 99—278)

In the art of brewing, the customary steps are: malting, wherein the grain is converted into malt, mashing, wherein the malt is steeped in hot water and stirred to produce wort, boiling the wort with hops added thereto, cooling the wort, fermenting, clarifying and bottling or barreling. The hot wort contains much solid matter in suspension commonly called the hot break or hot break sludge and also some matter that is in solution when the wort is hot but is precipitated when the wort is cooled but tends to remain in suspension as the cold break or cold break sludge. Heretofore it has been common practice to remove hot break from the hot wort and then cool the wort and afterwards attempt to remove the cold break after fermentation has started. Heretofore it has been considered impracticable, for divers reasons, to delay the removal of the hot break until the wort is cooled.

The principal objects of the present invention are to devise a better, simpler, more thorough and more economical way of removing the suspended solids from the wort. The present invention consists principally in cooling the wort, while it still contains the hot break sludge, under conditions that overcome the difficulties and disadvantages that have heretofore made it impracticable to delay the removal of the sludge until the wort is cooled. It also consists in delaying the removal of the hot break solids until the wort is cooled. It also consists in aerating the wort at or above pasteurizing temperature and quickly cooling and simultaneously aerating it again and then separating the sludge therefrom by sedimentation. It also consists in a novel way of utilizing hot break for removal of cold break from the wort. It also consists in the process hereinafter described.

In the accompanying drawing, which forms part of this specification and wherein like symbols refer to like parts wherever they occur, Fig. 1 is a diagrammatic view illustrating my process of removing sludge from wort, Fig. 2 is an enlarged fragmentary vertical section on the line 2—2 in Fig. 1 through the upper portion of the flow plate of the vertical aerator unit; and Fig. 3 is a similar section on the line 3—3 in Fig. 1 through the flow plate of the vertical cooler unit.

At the stage of the process of brewing beer at which the hop boiling is completed and the hops strained out, the wort contains in suspension a considerable quantity of "hot break" which is of a flocculent character and rather heavy and can be readily separated from the liquid portion of the wort at any temperature by sedimentation. In addition to this hot break, the wort contains matter, which is in solution when the temperature of the wort is high enough but is coagulated or precipitated as "cold break" when the wort becomes cold. The particles of cold break are not flocculent but approach collodial size and are slow to settle and difficult to remove from the wort; but it is important to remove the cold break from the wort because it affects the taste and quality of the beer and tends to give it a hazy appearance.

According to the present invention, the hot break is kept in suspension in the wort until the wort is cooled to approximately the temperature used in the yeasting room, say about forty degrees Fahrenheit. At this temperature, most of the cold break matter is in the form of suspended solid particles which are adsorbed on the surfaces of the flocculent particles of hot break which are larger and heavier; and in consequence of such adsorption, the cold break particles are quickly carried down and settle with the hot break. The liquid portion of the wort is then decanted and yeast is added thereto preparatory to fermentation and other usual operations of making beer.

It is important to aerate the hot wort and it is desirable to do so before its temperature falls below the pasteurizing point. Such aeration of the hot wort has the effect of eliminating certain vapors or odors and of oxidizing matter that would be objectionable in the final product and of evaporating a minor portion of the water. It is also important that the cooled wort shall contain sufficient oxygen to assure proper activity of the yeast and it is desirable to aerate the wort in the process of cooling it.

According to the present process, the hot wort, after being boiled with hops in the usual wort copper or kettle A, is transferred to a hot wort receiving tank B through a hot wort supply line 1 equipped with a suitable hop strainer 2 and a suitable pump 3. The hot wort thence flows downwardly from the hot wort receiving tank B into a balance tank C through a pipe 4, thence downwardly through a pipe 5 to a device hereinafter called an aerator unit E, thence downwardly through a pipe 6 into a vertical cooler unit F, thence through a pipe 7 to a sludge separating tank G, and thence through a pipe 8 to a cold wort receiving tank H.

Preferably the pipe 4 leads downwardly through the hot wort receiving tank B from a point above the level of the bottom thereof, in order to trap a considerable portion of the heavy hot sludge in said tank and thereby keep it from entering said pipe and passing through the vertical aerator unit E and the cooler unit F. The heavy hot sludge thus trapped in the hot wort receiving tank is preferably by-passed around the aerator and cooler units to the sludge separating tank G through a pipe 9 equipped with a suitable cooling coil 10. As shown in the drawing, the pipe 4 opens upwardly through the bottom of the balance tank C into a basket-type strainer 11, which is spaced from the bottom and sides of said tank, whereby the wort flows through said strainer into the space between the latter and said tank. The outlet end of the pipe 4 is equipped with a valve 12 that is controlled by a suitable float 13, whereby the wort is maintained at a proper level in said balance tank; and the inlet end of the pipe 5 opens through the side of said tank just below the float controlled level of the fluid therein.

The hot wort passes downwardly through the pipe 5 into a closed evaporating chamber 14 in the vertical aerator unit E; and a current of sterile and attemperated air is forced in an upward direction through said evaporating chamber from a supply duct 15 in one side thereof and escapes from said chamber through an outlet duct 16 at the top thereof.

Inside of the evaporating chamber 14 of the vertical aerator unit E is a vertically disposed plate, or like structure 17 (hereinafter called a flow plate). The hot wort is delivered onto the upper part of the side surface or surfaces of said flow plate in such manner as to flow down the surface thereof in a thin, wide, continuous sheet. By this arrangement, the wort exposes to the air current a very large surface that is favorable to evaporation, oxidation and elimination of vapors. In order to further increase the exposed area of the wort and bring about a suitable degree of agitation thereof, it is preferable to form horizontal corrugations 18 in the surface of the flow plate.

The hot aeration of the wort proceeds very rapidly and continuously; that is, the hot aeration is effected in the few seconds required for any given portion of the wort to traverse the distance from the top to the bottom of the flow plate 17. Thus the wort, which reaches the top of the flow plate 17 at a temperature in the neighborhood of two-hundred degrees Fahrenheit, is still above pasteurizing temperature, say above one-hundred fifty degrees Fahrenheit, when it reaches the bottom of said flow plate.

As shown in the drawing, the vertical aerator unit E is provided below the flow plates 17 with a tank 19 for receiving the wort from the lower edge of the vertical flow plate 17. Foaming of the wort in the receiving tank 19 is minimized by means of an anti-foam device comprising plates 20 that are located between the flow plate 17 and the receiving tank 19 and slope inwardly and downwardly toward each other from opposite side edges of said flow plate, with their adjacent edges spaced apart and terminating in downturned drip edges 21 that extend into the upper end of a compartment 22 formed in and in continuous communication with said tank through an opening 23 in the lower portion of said compartment.

From the receiving tank of the vertical aerator unit E, the wort, which is still warm, flows downwardly through the pipe 6 into the top of a cooling chamber 24 in the cooler unit F. Sterile and attemperated air is supplied to the chamber 24 of the cooler unit through a duct 25, such air passing upwardly through said chamber in contact with the wort and escaping therefrom through an outlet duct 26 on the top thereof. Located in the cooling chamber 24 is a cooling element of the so-called outside trickle type, said element preferably consisting of two vertically disposed flow plates 27 formed with matching horizontal corrugations 28 arranged to form a tortuous passage 28a for ammonia or other refrigerating fluid that is capable of effecting rapid cooling of the wort.

The cooling medium is supplied to the passageways 28a of the flow plate 27 of the cooler unit F by means of pipes 29. The cooler unit F is provided with a receiving tank 30 equipped with an anti-foam device like the anti-foam device of the receiving tank 19 of the aerator unit E. As stated, the wort is delivered into the cooling chamber 24 and onto the corrugated outer surfaces of the flow plates 27 in a continuous thin stream or sheet and flows as such down over the outer surfaces of said plates into the receiving tank 30. The wort flows from the tank 30 of the cooling unit F through the pipe 7 into the shallow open sludge separating tank G, which is located in an air conditioned room. In this sludge separating tank, the sludge is deposited by sedimentation and the liquid decanted and transferred through the pipe 8 to the cold wort receiving tank H where the decanted liquid is supplied with yeast through a pipe 31 and is afterwards transferred to the fermenting cellars (not shown) through a pipe 32.

The cooler unit F is of such capacity that the wort is cooled to about forty degrees Fahrenheit, that is, to approximately the temperature used in the yeasting room, and this cooling is effected in the few seconds required for the wort to travel from the top to the bottom of the cooler. During this period, the cold break is precipitated and most of it is immediately adsorbed by the large heavy and flocculent particles of the hot break and deposited with such hot break at the bottom of the sludge separating tank.

It is an advantage of my process that the evaporating and cooling of the wort are effected while the wort is flowing downwardly over the outer surfaces of the flow plates in the aerator and the cooler units in the form of a shallow or thin continuous sheet. In consequence of this condition, there are no holes that the sludge might clog and there is very little tendency for the sludge to deposit on the vertically disposed surfaces, especially as the flowing liquid tends to keep the sludge in motion.

In order that the amount of wort flowing over the surfaces of the flow plates of the aerator and cooler units shall be substantially uniform throughout the width of the stream and also to prevent the danger of clogging distributing jets or orifices, it is preferable to deliver the wort to said flow plates of the aerator and cooler units, respectively, by means of a horizontal distributing pipe 33 located above the top thereof, which pipe has in its top an elongated slot 34 of sufficient width to preclude danger of clogging, for instance, about one-fourth inch wide. With such a slotted horizontal distributing pipe, the wort wells up and issues over the horizontal edge or edges of the slot in a continuous unbroken stream or streams that hug the vertical side surfaces of the flow plates and assure uniformity of distribution and aeration of the wort.

In this way, applicant avoids the use of small orifices and jets, which are not only subject to clogging with resulting unevenness of distribution of the wort and difficulty in keeping the orifices open and in sanitary condition, but which cause the wort to issue in spaced jets and with a velocity that involves more or less spattering of the wort. Along with this great advantage, applicant's process effects thorough and controllable aeration of both the hot wort and of the wort in the process of cooling, and without any interruption of the continuity of the flow of the wort from the time it leaves the brew house to the time it reaches the sludge separating tank below the cooler.

While I count on the adsorption of the fine cold break particles by the flocculent hot break, it is not necessary that all of the hot break should be kept in the wort in its passageway through the evaporating and cooling chambers. It is sufficient if a considerable portion, for instance about a half, of the hot break is present in the wort as it passes through the aerator and cooler units to the sludge separating tank. Thus, the heavy sludge deposit may be drained from the bottom of the hot wort receiving tank B through the drain line 9 and cooling coil 10 directly into the sludge separating tank G beyond the aerator and cooler units, where it is agitated, along with the cold break and hot break received from said units, by means of air blown into it, for instance, by moving an air jet member 35 back and forth through the wort in said sludge separating tank after the latter has been filled. This by-passing of the heavy sludge around the balance tank and the aerator and cooler units has the advantage of making the wort more liquid and free flowing and less likely to deposit sludge in or on said tank and units and in the pipes communicating therewith. After the decanted liquid is transferred from the sludge separating tank G to the cold wort receiving tank H, the sludge deposit in said sludge separating tank is transferred therefrom through a pipe 36 to a suitable sludge filter (not shown).

What I claim is:

1. In a system for removing solids from a liquid which contains matter that is permanently coagulated by heat and matter that is temporarily coagulated by cold, a main receiving tank for the hot liquid, an aerator unit arranged to receive the hot liquid from said receiving tank, a cooler unit arranged to receive the hot liquid from said aerator unit, a sludge separating tank arranged to receive the cold liquid from said cooler unit, and a receiving tank arranged to receive the decanted liquid from said sludge separating tank, each of said aerator and cooler units comprising a vertically disposed flow plate and means for delivering the liquid to the top edge thereof in a wide continuous stream, and means for providing a flow of attemperated air upwardly alongside of said flow plate.

2. In a system for removing solids from a liquid which contains matter that is permanently coagulated by heat and matter that is temporarily coagulated by cold, a main receiving tank for the hot liquid, an aerator unit connected to said receiving tank to receive the hot liquid therefrom, a cooler unit arranged to receive the hot liquid from said aerator unit, a sludge separating tank arranged to receive the cold liquid from said cooler unit, and a receiving tank arranged to receive the decanted liquid from said sludge separating tank, each of said aerator and cooler units comprising a vertically disposed flow plate and means for delivering the liquid to the top edge thereof, said means comprising a horizontal pipe located directly above and longitudinally of said top edge of said flow plate, said pipe having a slot located in the top thereof and extending continuously substantially from side edge to side edge of said flow plate, whereby the liquid wells up and issues over each longitudinal side edge of said slot in a thin, wide continuous stream that flows downwardly over the corresponding outer side face of said flow plate, and means for supplying a flow of sterile attemperated air upwardly alongside of said flow plate.

3. In a system for removing solids from a liquid which contains matter that is permanently coagulated by heat and matter that is temporarily coagulated by cold, a main receiving tank for the hot liquid, an aerator unit connected to said receiving tank to receive the hot liquid therefrom, a cooler unit arranged to receive the hot liquid from said aerator unit, a sludge separating tank arranged to receive the cold liquid from said cooler unit, and a receiving tank arranged to receive the decanted liquid from said sludge separating tank, each of said aerator and cooler units comprising a vertically disposed flow plate and means for delivering the liquid to the top edge thereof, said means comprising a conduit rigid with and extending longitudinally of said top edge of said flow plate, said conduit having an elongated slot in the top thereof that extends continuously substantially from side edge to side edge of said flow plate, whereby the liquid wells up and issues over each longitudinal side edge of said slot in a thin, wide continuous stream that flows downwardly over the corresponding outer side face of said flow plate, means for supplying a flow of sterile attemperated air upwardly alongside of said flow plate, the flow plate for said cooler having a passageway therein for a refrigerating medium, the connection between said main receiving tank and said aerator unit comprising a conduit that leads downwardly from said main receiving tank from a point above the level of the bottom thereof, whereby a considerable portion of the heavy sludge is trapped in the bottom thereof and prevented from entering said conduit, and a conduit having a cooling coil therein and leading from the bottom of said main receiving tank directly to the sludge separating tank.

4. In the art of brewing, a conditioning system for hot wort comprising a main receiving tank for the hot wort, an aerator unit connected to said receiving tank to receive the hot wort therefrom, a cooler unit connected to said aerator unit to receive the hot wort therefrom, a sludge separating tank arranged to receive the cold wort from said cooler unit, and a receiving tank arranged to receive the decanted liquid from said sludge separating tank, each of said aerator and cooler units comprising a vertically disposed flow plate and means for delivering the wort to the top edge thereof in a wide continuous stream, and means for providing a flow of sterile attemperated air upwardly alongside of said flow plate.

5. In the art of brewing, a conditioning system for hot wort comprising a main receiving tank for the hot wort, an aerator unit connected to said receiving tank to receive the hot wort therefrom, a cooler unit connected to said aerator unit to receive the hot wort therefrom, a sludge separating tank arranged to receive the cold wort from said cooler unit, and a receiving tank arranged to receive the decanted liquid from said sludge separating tank, each of said aerator and cooler units comprising a vertically disposed flow plate and means for delivering the wort to the top edge thereof, said means comprising a horizontal conduit rigid with and extending longitudinally of said top edge of said flow plate, said conduit having a slot in the top thereof extending continuously substantially from side edge to side edge of said flow plate, whereby the wort wells up and issues over each longitudinal side edge of said slot in a thin, wide continuous stream that flows downwardly over the corresponding outer side face of said flow plate, and means for providing a flow of sterile attemperated air upwardly alongside of said flow plate.

6. In the art of brewing, a conditioning system for hot wort comprising a main receiving tank for the hot wort, an aerator unit connected to said receiving tank to receive the hot wort therefrom, a cooler unit connected to said aerator unit to receive the hot wort therefrom, a sludge separating tank arranged to receive the cold wort from said cooler unit, and a receiving tank arranged to receive the decanted liquid from said sludge separating tank, each of said aerator and cooler units comprising a vertically disposed flow plate and means for delivering the wort to the top edge thereof, said means comprising a horizontal pipe located directly above and longitudinally of said top edge of said flow plate, said pipe having a slot in the top thereof extending continuously substantially from side edge to side edge of said flow plate, whereby the wort wells up and issues over each longitudinal side edge of said slot in a thin, wide continuous stream that flows downwardly over the corresponding outer side face of said flow plate, and means for providing a flow of sterile attemperated air upwardly alongside of said flow plate, the connection between said main receiving tank and said aerator unit comprising a conduit that leads downwardly through said main receiving tank from a point above the level of the bottom thereof to thereby trap a portion of the heavy hot sludge therein, and a conduit leading from the bottom of said main receiving tank directly to the sludge separating tank whereby such trapped sludge may be by-passed around said aerator and cooler units directly to said sludge separating tank.

FRANK H. SCHWAIGER.